April 13, 1965 L. N. LEA 3,178,188

ELECTRICALLY-CONTROLLED PHONOGRAPH APPARATUS

Filed March 8, 1962

INVENTOR.
LAWRENCE N. LEA,
BY [signature]
ATTORNEY.

United States Patent Office 3,178,188

Patented Apr. 13, 1965

3,178,188

ELECTRICALLY-CONTROLLED PHONOGRAPH APPARATUS

Lawrence N. Lea, 1683 University Ave., Bronx, N.Y.

Filed Mar. 8, 1962, Ser. No. 178,319
14 Claims. (Cl. 274—9)

The present invention relates to phonograph apparatus driven by an electric motor and contemplates the use of a revolving record which has successive lanes of sound track whose subject matter musically and/or intellectually, may all be of one topic or on different topics respectively.

An object of this invention is to provide a novel and improved electrically-driven and electrically-controlled phonograph apparatus of the character mentioned, which is adapted to play one lane at a time and stop at the end of each lane, for it requires that an element be moved to commence the playing of each lane respectively after a lane has been played.

Another object thereof is to provide a novel and improved phonograph apparatus of the kind described, in which the element to be moved to commence playing of the next lane, may be remote from the apparatus.

A further object of this invention is to provide in such phonograph apparatus a novel and improved means to bring the stylus to the start of the record from any position it may be thereon.

Another object thereof is to provide that the playing shall stop at the end of any lane of the record, or to permit the whole record to be played from start to finish.

Still a further object of this invention is to provide an electrically-driven, electrically-controlled phonograph apparatus of novel and improved construction, having the mentioned attributes, which is simple in construction, reasonable in cost, easy to understand, simple to use and efficient in carrying out the purposes for which it is designed.

Other objects and advantages will become apparent as this disclosure proceeds.

For the practice of this invention, one form it may assume is to have an electric motor arranged to rotate a phonograph record having successive sound track lanes as heretofore mentioned. A pick-up arm is pivotally mounted so that its associated stylus can traverse the record; such arm being resilient so that the stylus bears with sufficient pressure against the record in a sound groove. Said pick-up arm has a laterally extending finger adapted for wiping connection with any one of a series of spaced contact elements on the frame; such contact elements being electrically connected, but insulated from the frame, so that with said finger, a first switch means is created for control of the motor circuit. In parallel with said first switch means, is a normally open push-button switch and there is a third switch in series with said first switch. It is to be noted that the wiping contact finger of the first switch is between two contact elements when the stylus is at the end of a record lane. The frame may be comprised of two plates held apart by spacers, so that between such plates, the motor is mounted and dry cells to power same, held. Said pick-up arm is fixed on a post which is rotatably mounted on the frame and said post is also capable of longitudinal movement, but is spring-biased so that the stylus shall normally contact the record. Longitudinal movement of said post to further stress its associated spring means, will move the pick-up arm and the finger thereon to a position where the stylus is off the record and said finger is off a contact element. When the post is so moved longitudinally, it will automatically be turned by a cam means to bring the stylus back to a position directly opposite the start of the record. Then upon release of said post, the stylus will engage the start of the record and the said finger will contact the first contact element in the embodiment shown.

In another embodiment, the mentioned first switch means is offered by having the stylus serve as the wiping contact, and the record being made of conductive material with insulative rings defining the divisions between the lanes, whereby each lane ring constitutes a contact element.

I will now give a detailed description for which I will resort to the accompanying drawing which forms a part of this application. In such drawing, similar characters of reference indicate corresponding parts in all the views.

Figures 3, 7:
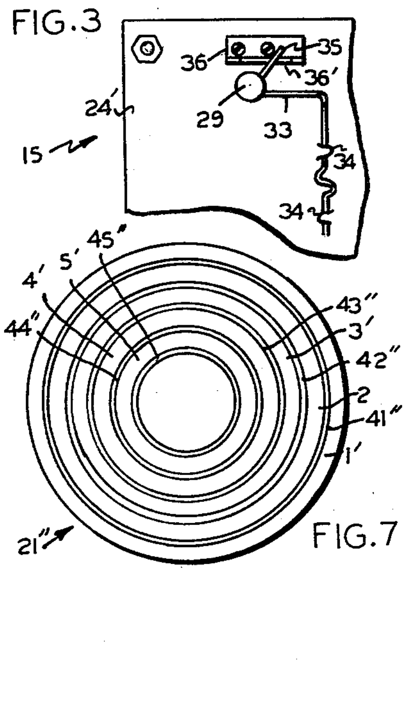
FIG. 3 is a fragmentary bottom view of FIG. 1.

FIG. 7 relates to a modified construction and shows the face of a record provided for same (groove omitted).

Figure 8:
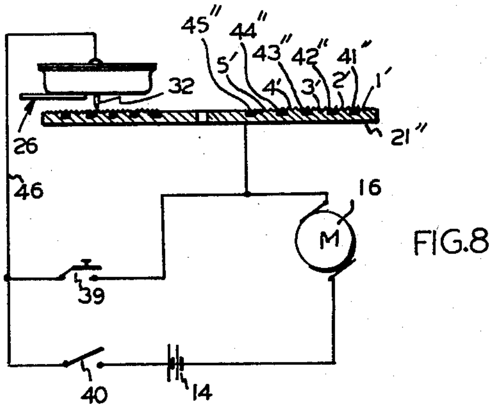

FIG. 8 shows a section through said record of FIG. 7 and indicates the stylus in contact therewith to constitute a switch means and this view includes such switch in the motor control circuit.

In the drawing, the numeral 15 designates generally a phonograph apparatus including an electric motor 16 whose shaft is fitted with a comparatively small pulley 17. A shaft 18 journalled on the frame denoted generally by the numeral 19, carries a comparatively large pulley 20 which supports the record indicated generally by the numeral 21. An endless belt 22 connects said pulleys which are in proper ratio to give the shaft 18 the proper speed at which said record shall rotate. The record is preferably held fast on the pulley 20, which as here shown is by the tightened nut 23 on the threaded end of the shaft 18. The frame 19 comprises the upper and lower sheet metal plates 24, 24', held apart by the spacers 25, to hold the motor 16 and its batteries 14.

The pick-up arm designated generally by the numeral 26, comprises a thin springy strip, fixed to and extending laterally from the post shaft denoted generally by the numeral 29 at one of its ends, and at its other end, said strip is suitably secured or welded to a metal cup 30 having a diaphragm 31 from which extends a stylus 32. Said diaphragm is held as a cover for said cup. The stylus 32 extends through the cup, through a hole in the cup's bottom and thence with its point into a sound groove on the record 21. The stylus is of course fixed to said diaphragm 31 and such assembly serves when the record 21 is rotating, to translate the resulting vibrations of the stylus 32 as determined by the sound groove 21', into sound, which is well known.

Figure 1:
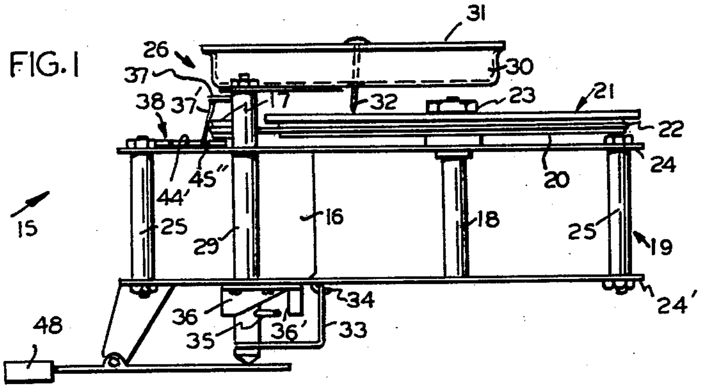
FIG. 1 is an elevational view of a phonograph apparatus embodying teachings of this invention.
Figure 5:
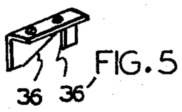
FIG. 5 is a perspective view of the cam element which cooperates with a pin extending from the post carrying the pick-up arm, to bring said arm to the start of the record.
Figure 6:
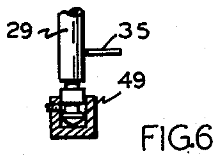
FIG. 6 is a fragmentary showing of said post and pin with a swivelled button for manually moving said post longitudinally whereupon co-action of said pin and the cam of FIG. 5, will cause said post to turn as required.

The shaft 29 is fitted through aligned holes in both of the frame plates 24, 24', for rotary movement and for longitudinal sliding movement. It is however biased by a stressed spring element 33 which may be of wire held fast at one end by the engagement tabs 34 struck from the plate 24', so that normally, the stylus 32 is in contact with the record 21. It is evident from FIG. 1, that upon an upward shift of said shaft 29, the stylus will leave the record and that upon release of such shaft, the stylus will come onto the record. Said shaft has a laterally extending pin 35, which upon an upward shift of said shaft 29, will co-operate with the cam 36 fixed to the frame, to impart a counter-clockwise partial turn to said shaft; said cam being so designed to bring the pick-up arm 26 from any position the stylus may be at on the record, back to the start of the record.

Also moving with said shaft 29, is a conductive brush arm 37 which is in wiping contact with the spaced, but electrically connected contact segments which constitute the member indicated generally by the numeral 38, carried fixed on, but insulated from the frame.

The record 21 is divided into a number of successive lenses, here indicated by the numerals 1–5. Hence there are five contact elements formed in the member 38 and designated respectively by the numerals 41–45, each of such width, that the brush 37′ is at the start of that element which corresponds to a record lane, at whose start the stylus 32 is, and when said stylus reaches the end of such lane, the brush will have traversed and be off such contact element and be on an insulative inlay; such inlays being indicated as 41′–45′ respectively. It is preferred that the insulation insert 45′ which is at the end of the record, have a groove 45‴ to engage the brush 37′, to hold the pickup-arm 26 from movement, where it is placed when the apparatus 15 is to be put away or while in shipment.

Figure 4:
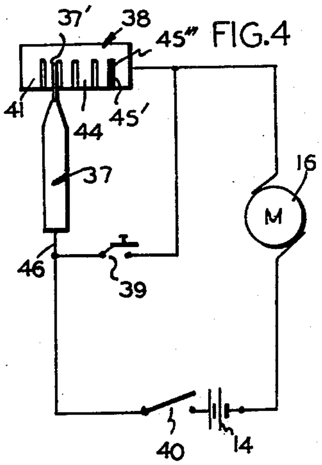
FIG. 4 is a wiring diagram of the motor and its controls, included in the embodiment shown in FIGS. 1–3.

In the motor control circuit shown in FIG. 4, it is evident that the brush arm 37, in co-operation with the contact segments or elements 41–45 of member 38, constitute a switch, connected in series with an optionally-included switch 40, the dry cells 14 and the motor 16. There is a normally open push-button switch 39 connected in parallel with the switch comprising the components 38, 37. It is evident that when the switch 40 is closed, the motor 16 will run either when the push-botton switch 39 is closed or when the brush 37′ is in contact with any of the contact segments 41–45. When the apparatus 15 is to be operated, the switch 40 is maintained closed, in which condition it will now be deemed to be.

Figure 2:
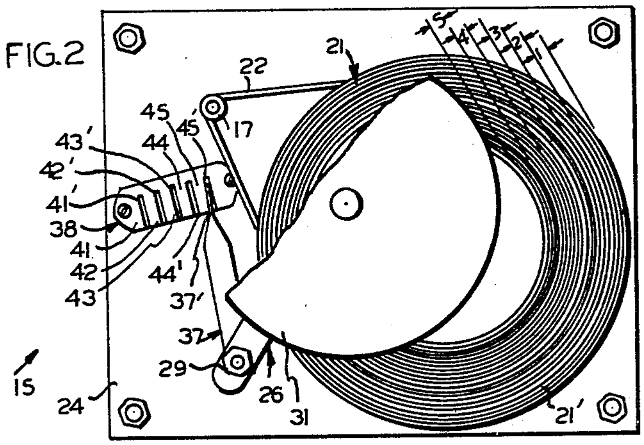
FIG. 2 is a top plan view of FIG. 1, with part of the pick-up means broken away to expose other components to view.

In the condition the apparatus is shown to be in FIG. 2, the stylus 32 is at the end of the record and the brush 37′ is in the groove 45‴. The motor circuit is open. Now, push the shaft 29 at its lower end, with thumb nail, lever 48, or on a swivelled cap 49 which may be provided for such purpose. This will cause the pin 35 to bear against the cam 36 so said shaft will turn counter-clockwise while it moves longitudinally. The result will be that the stylus 32 will lift off the record 21, the brush 37′ will lift off the member 33 and the turn of said shaft will bring the stylus opposite the start of record lane 1 and the brush opposite the start of the segment 41. Now upon release of the shaft 29, the spring 33 will restore its normal position so that the stylus shall engage the record at the start of lane 1 and the brush will contact the segment 41. The motor circuit is closed by such brush contact and lane 1 will be played. As soon as the brush 37′ goes off the contact segment 41, which occurs at the completion of play of the record lane 1, it is on the insulative insert 41′, and so the motor circuit will be open and of course motor and record movement will stop.

Now, to play the second lane indicated as 2, close the push-button switch 39 for an instant. This will close the motor circuit for such instant and the motor will run so playing of lane 2 will commence, and during such instant, the brush 37′ will contact the element 42 so that opening of the switch 39 will not effect motor operation, because motor circuit remains closed, whereupon all of the lane of the record will be played.

At the end of playing of each lane, the apparatus will stop automatically and the operator can cause the playing of the immediately successive lane, upon closing the push button switch 39 for a slight interval. If it is desired that the whole record be played without stopping, that upon the completion of the playing of any record lane, there shall be no stopping thereafter until the record is finished playing at the end thereof, just hold the push-button switch 39 closed from where you start playing until the playing has reached a bit beyond the commencement of the last lane 6.

It is to be noted that the switches 39 and 40 may be mounted on the apparatus frame or on any structure the apparatus 15 may be incorporated into, or such switches may be remote from the said apparatus, in which latter event, the dry cells 15 may be in a casing held in hand and the said switches mounted on such casing, as is well known for instance in the electrically operated toys and hence in readily understood without any further illustration.

As a modified embodiment, I omit the brush arm 37 and in its stead use the stylus 32 to serve as a contact brush on a metal record 21′ having sound lanes separated by inlay insulative rings as for instance 41″–44″ and another at 45″ which is at the end of the record. The sound lanes 1′–5′ being conductive and spaced, serve in place of the member 38. The diaphragm 31 being of non-conductive paper, the connecting line 46 is directly connected to the stylus. The electrical hook-up for such embodiment is shown in FIG. 8, which is in all respects that of FIG. 4 as to system of electrical connection and as to mode of operation. I have therefore indicated identical parts by the same reference numerals in both the FIGS. 4 and 8, and the difference as mentioned, is that member 38 is now replaced by the record 21′, constructed to have electrically connected but spaced contact segments which are the record lanes, and the wiping contact member 37, has been replaced by the stylus 32.

I may note that when the stylus 32 is at the start of the record, whether 21 or 21′, the pin 35 is in contact with the stop edge 36′ on the cam element, and that as the stylus traverses the record from start to finish, the shaft 29 turns a partial revolution in clock-wise direction. Also to be noted, is that the sound groove of the record in every case, is continuous from start to finish and preferably with "silent" groove lengths between playing lanes.

This invention is capable of numerous forms and various applications without departing from the essential features herein disclosed. It is therefore intended and desired that the embodiments herein shall be deemed merely illustrative and not restrictive and that the patent shall cover all patentable novelty herein set forth; reference being had to the following claims rather than to the specific description and showing herein, to indicate the scope of this invention.

I claim:

1. In a phonograph apparatus, a frame, an electrically conductive phonograph record revolvably mounted on the frame, an electric motor with means arranged to turn said record when the motor is actuated, a pick-up arm swingably mounted on the frame, for movement across said record; said pick-up arm having means including a stylus associated with a diaphragm; said stylus being positioned to contact said record; said last-mentioned means adapted when the record is turning and said stylus is in a sound groove on said record, to translate vibrations of said stylus into sound; said pick-up arm being biased so that said stylus normally contacts said record; said record having spaced insulative rings sections whereby conductive record sections are exposed between said insulative rings and said stylus and record are interposed in the circuit for actuating said motor; said record and stylus constituting a first switch means interposed in said circuit to control motor operation; said stylus and record being insulated from each other by said insulated rings to interrupt the operation of the motor.

2. A phonograph apparatus as defined in claim 1, including means to close said circuit manually.

3. A phonograph apparatus as defined in claim 1, including a third switch means in series with the first switch means and a second switch means in parallel with the first switch means; said second switch means being biased to be in open condition.

4. A phonograph apparatus as defined in claim 3, wherein the second switch means is of the push-button type.

5. In a phonograph apparatus, a frame, a phonograph record revolvably mounted on the frame, an electric motor with means arranged to turn said record when said motor is actuated, a pick-up arm swingably mounted at one of its ends on the frame, for movement across the record and including a stylus associated with a diaphragm at its other end, adapted when the record is turning and said stylus is in contact with a sound groove on the record, to translate vibrations of the stylus into sound; said arm being biased so that the stylus normally contacts the record, a first electrical switch means including a predetermined number of conductive segments carried on the frame in a predetermined spaced relation, conductive means connecting said segments and constituting one terminal of said first switch means, a conductive element moving with said pick-up arm, constituting the other terminal of said first switch means, adapted for wiping contact with one of said conductive segments at a time to successively traverse said segments as the stylus moves from the start to the end of the record upon the rotation of said record, a circuit for actuating said motor, and a second switch means interposed in said circuit to control the operation of said motor; the terminals of the first switch means being respectively connected to the terminals of the second switch means.

6. A phonograph apparatus as defined in claim 5, wherein the second switch means is biased to be in open condition.

7. A phonograph apparatus as defined in claim 6, wherein the second switch means is of the push-button type.

8. A phonograph apparatus as defined in claim 5, including a third switch means interposed in said circuit to open it when desired though any of the other switches are in closed condition.

9. A phonograph apparatus as defined in claim 5, wherein the record is of conductive material and provided with spaced insulative rings whereby conductive record sections are formed between said rings; said record sections constituting the spaced conductive segments and the stylus constituting the wiping contact element.

10. In a phonograph apparatus, a frame, an electrically conductive phonograph record revolvably mounted on the frame; said record having at least one insulative region thereon intermediate the start and the finish of its sound groove, an electric motor with means arranged to turn said record when the motor is actuated, a pick-up arm swingably mounted on the frame, for movement across said record; said pick-up arm having means including a stylus associated with a diaphragm; said stylus being positioned to contact said record; said last-mentioned means being adapted when the record is turning and said stylus is in a sound groove on said record, to translate vibrations of said stylus into sound; said pick-up arm being biased so that said stylus normally contacts said record and said stylus and record are interposed in the circuit for actuating said motor; said record and stylus constituting a first switch means interposed in said circuit to control motor operation; said stylus and record being insulated from each other by said insulated rings to interrupt the operation of the motor.

11. A phonograph apparatus as defined in claim 10, wherein said record has a plurality of insulative regions in spaced relation thereon intermediate the start and the finish of its sound groove.

12. A phonograph apparatus as defined in claim 10, including means to close said circuit manually.

13. A phonograph apparatus as defined in claim 10, including a third switch means in series with the first switch means and a second switch means in parallel with the first switch means; said second switch means being biased to be in open condition.

14. A phonograph apparatus as defined in claim 13, wherein the second switch means is of the push-button type.

References Cited in the file of this patent

UNITED STATES PATENTS

| | | |
|---|---|---|
| 2,063,578 | Berglund | Dec. 8, 1936 |
| 2,076,937 | Cannon | Apr. 13, 1937 |
| 2,088,516 | Grier | July 27, 1937 |
| 2,562,470 | Marnell | July 31, 1951 |